(No Model.)
H. A. CLARK.
ELECTRICAL CONDUCTOR.
No. 336,992. Patented Mar. 2, 1886.
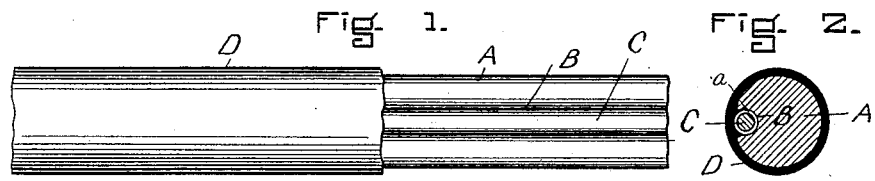
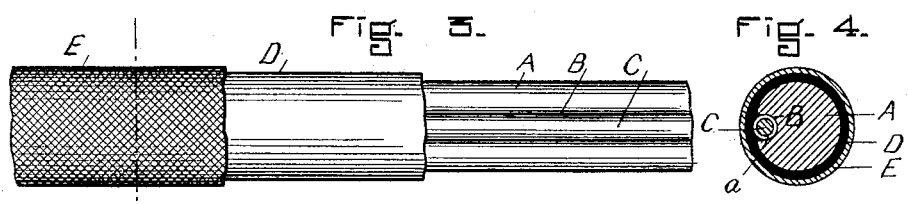
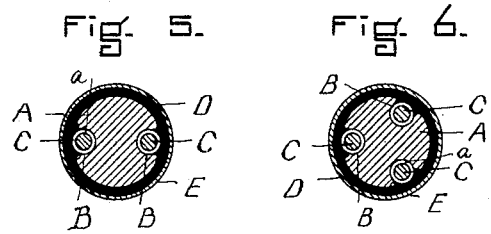 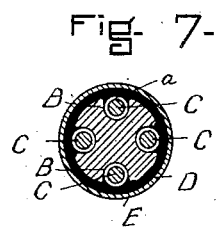
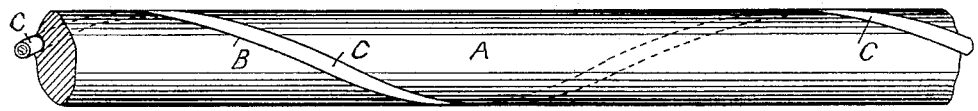
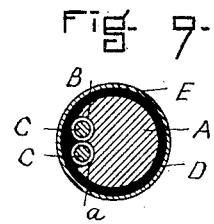
WITNESSES.
Cassius Clay Powers,
Frank Jenkins.
INVENTOR.
Henry A. Clark.
Per Brown Bros.
Attorneys.

UNITED STATES PATENT OFFICE.

HENRY A. CLARK, OF BROOKLINE, ASSIGNOR, BY MESNE ASSIGNMENTS, TO THE EASTERN ELECTRIC CABLE COMPANY, OF BOSTON, MASS.

ELECTRICAL CONDUCTOR.

SPECIFICATION forming part of Letters Patent No. 336,992, dated March 2, 1886.

Application filed February 11, 1885. Serial No. 155,613. (No specimens.)

*To all whom it may concern:*

Be it known that I, HENRY A. CLARK, of Brookline, in the county of Norfolk and State of Massachusetts, have invented certain new and useful Improvements in Electrical Conductors, of which the following is a full, clear, and exact description.

This invention relates to improvements in telegraphic, telephonic, and electric conductors, the object of which is to provide a support for one or more insulated electric wires, to obviate induction and leakage, and to form a metallic circuit when desired; and the invention consists of an electric conductor composed of a bare wire of steel or iron, or of any suitable material that is a good conductor of electricity, and preferably one that combines strength and durability, having one or more grooves along its length, either longitudinally or spirally therewith, or the wire, after being grooved longitudinally, twisted to give the spiral direction to the groove or grooves, one or more insulated electric wires lying or disposed in each of said grooves, the whole covered or coated or surrounded with any suitable insulating material—such as india-rubber or gutta-percha, &c.—and with an outside covering of fibrous material—such as silk, cotton, or other suitable fibrous material—braided thereon, to serve as a protection to said insulating material and to hold all parts closely and firmly together, all substantially as hereinafter fully described.

In the accompanying sheet of drawings is illustrated an electric conductor constructed according to this invention.

Figure 1 shows in side view the electric conductor and a portion of the bare wire with its groove, in which groove is an insulated electric wire. Fig. 2 is a cross-section on line 2 2, Fig. 1. Fig. 3 is a similar view to Fig. 1, but showing, in addition thereto, the exterior covering of fibrous material. Fig. 4 is a cross-section on line 4 4, Fig. 3; Figs. 5, 6, and 7, cross-sections similar to Fig. 4, but showing a bare wire with two, three, and four grooves, respectively, with an insulated electric wire in each groove. Fig. 8 is a side view of a bare wire having a spiral groove along its length, with an insulated electric wire in said groove. Fig. 9 is a cross-section similar to Fig. 4, but showing two insulated electric wires lying within the groove.

In the drawings, A represents a bare wire, of steel, iron, or copper, or of any suitable material that is a good conductor of electricity, and preferably a material combining strength and durability. This wire A, as shown in Figs. 1, 2, 3, 4, and 9, has a longitudinal groove, B. In this groove B is laid or disposed an insulated electric wire, C, the groove being preferably of a depth for the insulated electric wire C, with its insulating material $a$, to lie entirely within the circumference of the wire A, and of a width, preferably, for it to closely fit the same. After the insulated electric wire C is placed within the groove B the whole is coated or covered or surrounded with an insulating material, D—such as india-rubber or gutta-percha, &c., or of any suitable insulating material—and the insulating material covered with a fibrous material—such as cotton, silk, or other fibrous material, E—braided, as a protection to the insulating material D and to hold all parts firmly and closely together.

In Figs. 5, 6, and 7 are shown in cross-section a bare wire, A, having, respectively, two three, and four longitudinal grooves B, in each of which grooves is an insulated electric wire, C, all covered or coated with an insulating material, D, and an exterior fibrous covering, E.

In Fig. 8 is shown in side view a bare wire, A, having its groove B running in a spiral direction around the wire, in which groove is laid an insulated electric wire, C, the whole to be covered or coated with an insulating material, D, and an exterior covering of fibrous material, E, as before described in regard to the longitudinally-grooved wire.

The insulated electric wire C can be made of any suitable electric conducting material and insulated in any of the usual and well-known ways, this invention not being limited to any particular kind of insulated electric wire to lie in said groove.

The groove or grooves B in the bare wire can be made in any suitable manner, either by rolling the wire or by drawing it through a properly-constructed die, or by cutting, planing, or milling, or burring it, or in any suitable manner. The spiral groove or grooves can be made in a spiral direction around the wire, or after the straight or longitudinal groove or grooves have been made in the wire the wire can be twisted to give the spiral direction to the groove or grooves, the invention not being limited to any particular manner of making the groove in the wire nor to the number of grooves.

The wire can be of any shape in cross-section other than round, as shown, such as square, triangular, elliptical, &c.

In Fig. 9 is shown in cross-section a bare wire having two insulated electric wires, C, in its groove, and all covered with an insulating material, D, and an outside fibrous material, E.

Electric conductors prepared as above described have many advantages. The insulated electric wire or wires are the better protected from injury, either mechanical or otherwise, than if laid or wound on the outside of the bare wire, as, being within the groove, only a small portion of its surface is exposed; also, when the insulating material—such as india-rubber, &c.—is applied to and covered over the combined wires, much less of such insulating material is required, owing to the smaller diameter of the combined wires, than would be the case where the insulated electric wires are on the outside of the bare wire; also, in drawing the wires through the machine by which the insulating material is applied, liability to injury by the machine of the insulation of the insulated electric wire or wires is avoided.

In the use of an electric conductor prepared and arranged as herein described, when the bare wire has only one groove and one insulated electric wire, the bare wire can be used as a return-wire making a metallic circuit, and when two or more insulated electric wires are combined with the grooved bare wire the bare wire can be connected by a suitable electric conducting-wire with the ground, by which induction and leakage will be obviated to a great degree. The bare wire also serves for a good support for and protector to the insulated electric wire.

The figures in the drawings represent the bare wire as somewhat larger in proportion to the insulated electric wire than would be the case in practical operation.

I am aware that a compound electric cable has been made composed of a central grooved core, an insulated wire lying in said groove, an insulating-packing in the space of the groove not filled by the wire, said packing not covering the exterior of the core, and a casing inclosing the whole. My invention differs therefrom, among other particulars, in having a continuous insulating material filling the space between the groove of the core and insulated wire and also covering the exterior of both the core and wire between an exterior protecting-cover and said parts.

Having thus described my invention, what I claim is—

An electric conductor composed of a longitudinally-grooved core-wire, A, an insulated electric wire or wires, C, in the groove or grooves of the core-wire, an insulating covering material, D, surrounding the whole of the core-wire and retaining the electric wire or wires in the groove or grooves, and an exterior covering of braided fibrous material.

In testimony whereof I have hereunto set my hand in the presence of two subscribing witnesses.

HENRY A. CLARK.

Witnesses:
　EDWIN W. BROWN,
　WM. S. BELLOWS.